United States Patent [19]

Beasant et al.

[11] Patent Number: 4,541,512
[45] Date of Patent: Sep. 17, 1985

[54] TORQUE LIMITING CLUTCH

[75] Inventors: Andrew J. Beasant, Cheltenham; Olaf J. B. Orwin, Birmingham; David J. Fortune, Bath, all of United Kingdom

[73] Assignee: GIB Precision Limited, Gloucestershire, United Kingdom

[21] Appl. No.: 285,363

[22] Filed: Jul. 20, 1981

[30] Foreign Application Priority Data

Jul. 24, 1980 [GB] United Kingdom ............... 8024269

[51] Int. Cl.⁴ ........................................... F16D 43/20
[52] U.S. Cl. .............................. 192/56 R; 192/89 A; 464/36
[58] Field of Search ............ 192/56 R, 89 A; 464/36, 464/39

[56] References Cited

U.S. PATENT DOCUMENTS 2,775,327  12/1956  Gearhart ........................ 192/56 R
3,774,738  11/1973  Steinhagen ..................... 192/56 R

FOREIGN PATENT DOCUMENTS

1564512  3/1969  France .
2376720  4/1978  France .
462587   3/1937  United Kingdom .
875490   8/1961  United Kingdom .
1517692  7/1978  United Kingdom .
1517693  7/1978  United Kingdom .

Primary Examiner—Richard J. Scanlan, Jr.
Attorney, Agent, or Firm—Parmelee, Miller, Welsh & Kratz

[57] ABSTRACT

An overload clutch comprising a driving part and a driven part releasably interconnected in torque transmitting relationship by balls, held in a cage in engagement with torque transmitting recesses of the parts and which can be disengaged by relative rotation between the driving and driven parts when the torque to be transmitted exceeds a predetermined value and in which spacers are moved by the cage into spacing relationship with the parts to maintain the balls out of engagement with the recesses after disengagement with the clutch, and wherein the clutch can be re-engaged by relative rotation between the parts in the reverse direction to that which caused disengagement by the provision of two pairs of inter-engageable abutments and a first control means to prevent inter-engagement of one pair of the abutments as a result of relative rotation when the clutch is disengaged and to permit of inter-engagement of the abutments of the other pair on resetting by relative rotation in the reverse direction, and second control means to maintain the abutments of both pairs out of inter-engagement during the initial stages of disengagement of the clutch.

14 Claims, 12 Drawing Figures

TORQUE LIMITING CLUTCH

BACKGROUND OF THE INVENTION

1. Field of the Invention

This invention relates to a torque limiting clutch of the type described in our published U.K. Specification Nos. 1,517,692 and 1,517,693 namely a clutch of the type comprising opposed first and second members mounted for relative rotational and axial movement, a third member positioned between and mounted for rotational movement relative to the first and second members and for axial movement relative to at least one of the first and second members, the third member being provided with a torque transmitting element receiving aperture, a torque transmitting rolling element being positioned in the aperture in the third member, the first member comprising a driven member and being provided with a torque transmitting abutment for torque transmitting engagement with said torque transmitting element, another of said members comprising a driving member and being provided with a torque transmitting abutment for torque transmitting engagement with said torque transmitting element, resilient loading means to bias resiliently the first and second members towards one another, the arrangement being such that when the clutch is transmitting torque, the torque transmitting element is engaged with a driving member abutment and a driven member abutment so as thereby to prevent relative rotation between the driving and driven members and so that, on the torque to be transmitted exceeding a predetermined value, the torque transmitting element disengages from the abutment of at least one of the driving and driven members to permit of the driving and driven members to rotate relative to one another, a spacer element received in an opening in the third member and positioned between a first track axially located relative to one of the first and second members and a second track axially located relative to another one of the first and second members, a spacer element receiving means provided on at least one of the tracks and of such dimensions as to maintain the spacer element out of pressure contact with the tracks during torque transmission so as to ensure the torque transmitting element is maintained in pressure contact with the driven and second members, and a torque transmitting element receiving means provided on one of said driven and second members, whereby on disengagement of the torque transmitting element from the torque transmitting abutment on the driven member the third member is caused to rotate relative to the driven member and hence cause circumferential movement of the spacer element out of the spacer element receiving means and subsequently to cause the torque transmitting element to be engaged and maintained within the torque transmitting element receiving means with the driven and second members spaced apart by the spacer elements, the torque transmitting element receiving means being of such dimensions that the torque transmitting element is maintained out of pressure engagement with the driven and second members and relative rotation between the driving and driven members is permitted when the torque transmitting element is engaged in the torque transmitting element receiving means.

The present invention is concerned with an overload clutch of the above type in a version which comprises a driving part, a driven part, a cage guided rolling element, biasing means to bias axially said element into torque transmitting engagement with said parts when the clutch is engaged, a recess in one of said parts to accommodate said element and a spacer, movable by the cage into spacing relationship with said parts, to relieve the rolling element from said axial bias, as a result of relative rotation between the cage and said one part caused by orbital movement of the element when the clutch disengages, as a result of relative rotation between said parts; the rolling element being moved out of the recess into torque transmitting emgagement with said parts on resetting of the clutch by means of the cage, the cage and said other part being provided with interengageable resetting abutments to connect the cage to said other part on relative rotation between the cage and said other part whereby the rolling element is located in a torque transmitting position relative to the other part and thereafter relative rotation between the other part and the cage together on the one hand and said one part on the other hand, moving said one part into torque transmitting location with the element. Such a clutch will be referred to hereinafter as "of the type described".

2. Brief Description of the Prior Art

In our said published Specifications there are described a number of methods of resetting the clutches described therein which require either manual intervention or, in the case of automatic resetting, there is possible only resetting after the clutch has disengaged in a predetermined direction.

SUMMARY OF THE INVENTION

It is accordingly an object of the invention to provide an overload clutch of the type described which can disengage as a result of rotation in either direction and in which re-engagement is facilitated.

According to the present invention we provide an overload clutch of the type described wherein the clutch can be disengaged by relative rotation between said parts in either direction and the clutch can be re-engaged by relative rotation between said parts in the opposite direction to that which caused disengagement, the clutch comprising two pairs of inter-engageable abutments, one abutment of each pair being provided on the cage and the other on said other member, one pair of abutments being operable on relative rotation between the clutch parts in the opposite direction to that in which the other pair is operable, biasing means normally to bias one abutment of each pair in a direction towards engagement with the other abutment of the pair, first control means being provided on said one part
  (a) to prevent interengagement of the abutments of one pair when the clutch is disengaged as a result of relative rotation in one direction whilst permitting interengagement of the abutments of the other pair on resetting by relative rotation in the reverse direction to said one direction; and
  (b) to prevent interengagement of the abutments of the other pair when the clutch is disengaged as a result of relative rotation in the opposite direction to said one direction whilst permitting interengagement of the abutments of said one pair on resetting by relative rotation in the reverse direction to said other direction and second control means to maintian the abutments of both pairs out of interengagement during the initial stages of disengagement of the clutch.

Said one abutment of each pair may be provided by a spring biased pawl and the other abutment of each pair being adapted to be engaged by the pawl.

A separate pawl may provide each of said one abutments and each pawl may be mounted on the cage for pivotal movement about an axis parallel to the axis of rotation of the clutch and have an end part adapted to engage an abutment surface provided on the other clutch part.

The first control means may comprise an abutment provided on said one clutch part which is moved into engagement with the pawl to prevent engagement of the pawl with an abutment of said other pair as a result of relative rotation between the cage and one clutch part on disengagement of the clutch.

The second control means to maintain the abutments of both pairs out of engagement may comprise a pair of abutments extending from the one clutch part in a direction parallel to the axis of rotation of the clutch part and engageable with the pawls by means of cam surfaces so as to maintain the pawls out of engagement with the pawl recesses when the abutments are engaged with the pawls when the clutch is in the driving position, and to be disengaged therefrom as a result of axial movement of the one clutch part away from the other clutch part on disengagement of the clutch as a result of the drive transmitting element being displaced out of drive transmitting abutments and engagement of said cam surfaces causing the pawls to be moved out of engagement with the pawl recesses on movement of the one clutch part towards the other clutch part at the end of resetting as the drive transmitting rolling element enters its drive transmitting abutments.

Alternatively, a separate pawl may provide each of said one abutments and each pawl may be mounted on said other clutch part of movement generally parallel to the axis of rotation of the clutch and have an end part adapted to engage an abutment surface provided on the cage.

In this case, the first and second control means may comprise a cam surface provided on the one clutch part and facing said other clutch part and having a first surface part adjacent the other part which engages said pawls so that said pawls are maintained out of engagement with the abutments of the cage during said initial stages of disengagement, and having a second surface part spaced further away from the other part to permit the pawls to move into position for engagement with the associated abutment surface of the cage and third, inclined, surface parts between the first and second parts wherein on continued relative rotation between the one and other clutch parts after disengagement, said third surface parts displace the pawls out of position for engagment with the abutment surfaces of the cage and wherein each pawl is provided with an inclined surface facing in the circumferentially opposite direction to its abutment surface so that on reverse rotation in one direction said inclined surface of one of said pawls is engaged by an abutment surface to displace the pawl towards the other clutch member to permit passage of the cage, whilst on reverse rotation in the other direction the other pawl is thus displaced to permit passage of the cage on relative rotation in said other direction.

Alternatively, a single pawl may provide each abutment, said pawl being mounted on said other clutch part for movement generally parallel to the axis of rotation of the clutch and having an end part having a first abutment surface adapted to engage one abutment surface provided on the cage, and a second abutment surface adapted to engage the other abutment surface provided on the cage.

In this case, the first and second control means may comprise a cam surface provided on the one clutch part and facing said other clutch member and having a first surface part adjacent the other clutch part which engages said pawl so that said pawl is maintained out of engagement with the abutment surfaces on the cage during said initial stages of disengagement and having a second surface part spaced further from the other clutch part to permit the pawl to move into position for engagement with said abutment surfaces of the cage, and third, inclined, surface parts between the first and second surface parts wherein, on continued relative rotation between the one and other clutch parts after disengagement, said third surface parts displace the pawl out of position for engagement with the abutment surfaces of the cage whilst the pawl is permitted to move into engagement with an associated abutment surface of the cage on reverse rotation.

Interengageable abutments may be provided to restrain rotation of the cage relative to said one part on disengagement.

The spacer may be in anti-friction engagement with at least one of the driving and driven parts.

The spacer may be rotatable and circular in crosssection taken radial to its axis of rotation.

The spacer may be positioned between a first track comprising part of one of the clutch parts and a second track comprising part of the other of the clutch parts, there being recesses in at least one of the tracks of such dimensions as to maintain the spacer out of pressure contact with the tracks during torque transmittal.

The spacer may comprise a pair of roller bodies in mutual rolling engagement and one in rolling engagement with the one clutch part and the other in rolling engagement with the other clutch part. Consequently both of the tracks may be prevented from rotary movement about the axis of rotation of the clutch relative to the clutch part of which the one track comprises part.

Preferably a plurality of rolling elements and spacers are provided.

BRIEF DESCRIPTION OF THE DRAWINGS

Three embodiments of the invention will now be described in more detail by way of example with reference to the accompanying drawings, wherein.

DESCRIPTION OF THE PREFERRED EMBODIMENTS

Referring to the drawings, there is illustrated a torque limiting clutch comprising drive transmitting members 10 and 17. In this example the member 10 will be described as a driving member and 17 as a driven member, but it should be understood that if desired, the member 17 may be the driving member and the member 10 would then be the driven member. The inter-changeability of these terms should be appreciated throughout the Specification.

The driving member 10 comprises in this example a belt pulley adapted to be driven by a belt drive from a prime mover (not shown) in conventional manner. The driving member 10 is connected to a body 13 of the torque limiting clutch.

Rotatably mounted within the body 13 by means of a suitable bearing sleeve 16 is the driven member 17. A suitable thrust race 18 is interposed between a flange 19 on the member 17 and the driving member 10.

The driven member 17 has one clutch part 20 splined thereto for axially sliding and non-rotating movement relative to the driven member 17. A nut 22 is threadedly engaged with the outer end 23 of the driven member 17 and a coil compression spring 24 is interposed between the nut 22 and the one clutch part 20 to urge the one clutch part 20 towards the clutch body 13 an end part of which comprises another clutch part 15.

Interposed between the one and other clutch parts 20, 15 respectively are a plurality (in the present example 12) of torque transmitting elements in the form of spherical hardened steel balls 25. The balls 25 are received in bores 27 formed in a cage 28. The bores 27 are tapered towards their one end to prevent the balls 25 escaping therefrom at that end and thus to restrain the ball from axial movement, in the disengaged condition of the clutch, towards the clutch part 15 as hereinafter to be described.

Each clutch part 15, 20 is also formed with a corresponding number (in the present example 12) of torque transmitting abutments 29, 30 respectively, each taking the form of a generally frusto-conical recess.

Figure 1:
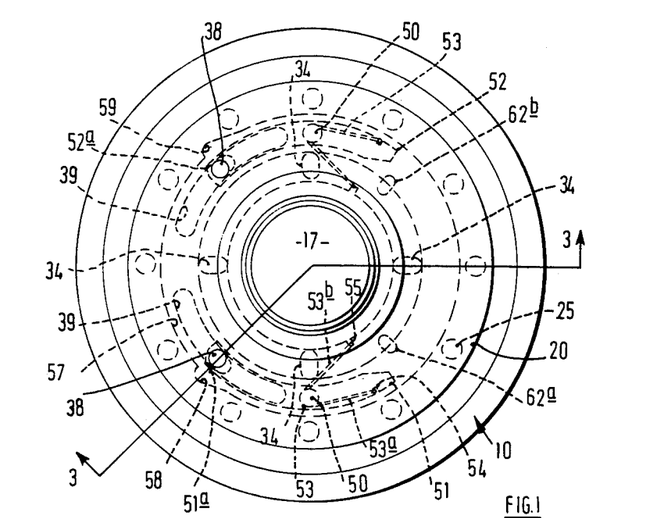
FIG. 1 is a diagrammatic plan view of a torque limiting clutch embodying the invention, showing the parts in torque transmitting relationship.
Figure 3:
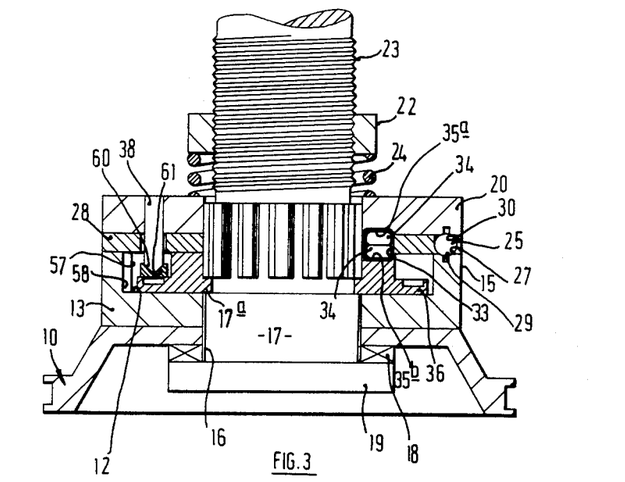
FIG. 3 is a diagrammatic cross-sectional view on the line 3—3 of FIG. 1.

The torque transmitting abutments 29, 30 and bores 27 are arranged so as to be mutually registerable so that the balls 25 can be received in the bores 27 and engage both the driving and driven abutments 29, 30 to permit the transmission of torque as hereinafter to be described in more detail and as shown in FIGS. 1 and 3.

The clutch part 20 is also formed with a plurality, (in the present example 12) of torque transmitting element receiving means. In this example, each receiving means is provided as a result of each torque transmitting abutment 30 having a dual purpose, namely either a torque transmitting abutment during normal torque transmittal or a receiving means when the clutch has disengaged. If desired, the receiving means may be provided separately from the torque transmitting abutment and may be of a different shape. The dimensions of the receiving means, whether provided by the torque transmitting abutments 30 or by the other recesses, is such that when the clutch is disengaged, with the clutch parts 15, 20 held apart by spacers as hereinafter to be described, the balls 25 have a slight clearance between the receiving means and the surface of the other clutch part 15 in the region intermediate the driving recesses 29 therein whereby no pressure is imposed upon the balls 25 by the surface of the other part 15 whilst the balls are in the receiving means of the one clutch part 20.

The cage 28 is also formed with four spacer receiving bores 33 within each of which are received two generally cylindrical spacer rollers 34.

The one clutch part 20 is provided with four spacer receiving means 35a each of prismatic configuration. The clutch part 20 comprises as part thereof a track for the spacers 34 which is provided by means of an annular member 36, received in a recess 12 formed in the body 13, splined to the driven member 17 and in abutment with a shoulder 17a on the driven member 17.

It is to be noted that the track 36 does not rotate relative to the one clutch part 20 and that the orbital movement of the spacers 34 with the cage 28 relative to the part 20 on resetting is permitted in these circumstances due to the provision of a pair of rollers 34 as each spacer.

Figure 2:
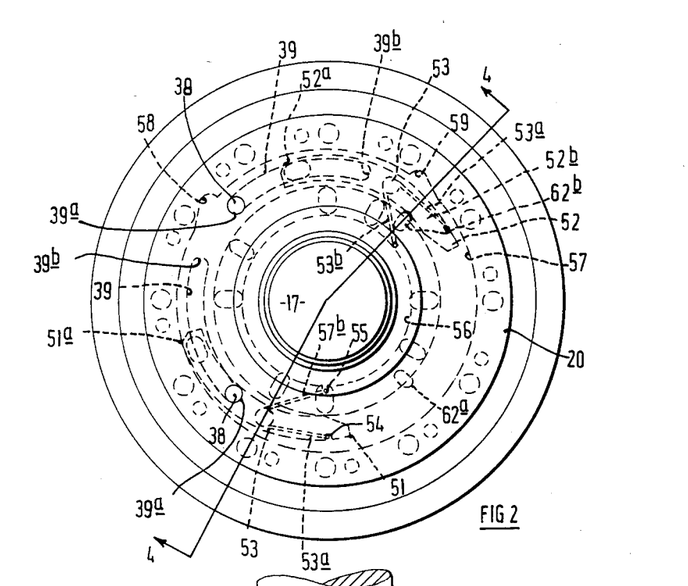
FIG. 2 is a similar plan view of the torque limiting clutch of FIG. 1 showing the parts after disengagement.
Figure 4:
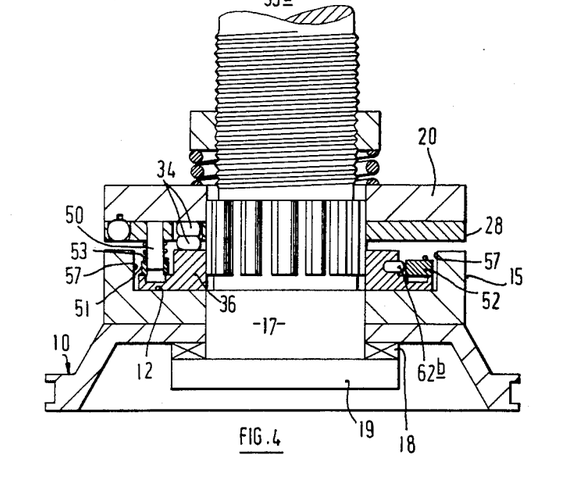
FIG. 4 is a diagrammatic cross-sectional view on the line 4—4 of FIG. 2.

Restraining means are provided to limit rotation of the cage 28 relative to the one clutch part 20 and hence relative to the driven member 17 by means of a pair of pegs 38 depending downwardly from the one clutch part 20 parallel to the axis of rotation of the clutch. Each peg 38 is received within a circumferentially extending slot 39 formed in the cage 28. As best shown in FIG. 1, when the clutch is engaged each peg 38 is in the middle of its associated slot 39 whilst when the clutch is fully disengaged, as shown in FIGS. 2 and 4, each peg 38 is in abutment with an end surface 39a of its associated slot 39. Of course, if the clutch has disengaged as a result of relative rotation in the opposite direction to that shown in FIGS. 2 and 4, the pegs 38 will be in engagement with the opposite ends 39b of the slot 39.

The cage carries a pair of downwardly depending pivot pins 50 upon which is pivotally mounted a pawl 51, 52.

Engaged round each pin 50 is a conventional torsion spring 53, one arm 53a of which has an upturned end received in a recess 54 of its associated pawl 51, 52 and the other arm 53b of which has an upturned end engaged in a notch 55 formed in the inner periphery 56 of the cage 28 so that each pawl 51, 52 is biased so that its abutment end 51a, 52a respectively is normally biased outwardly to bear against the inner peripheral surface 57 of the body 13. This peripheral surface 57 has pawl recesses 58, 59 for engagement respectively by the abutment ends 51a and 52a of the pawls 51, 52.

Adjacent the ends 51a and 52a of the pawls are provided recesses 60 of generally V shape in cross section as best shown in FIG. 3 and the pegs 38 have a corresponding conical end portion 61 which can engage within the recesses 60 and hold the pawl members in the position shown in FIG. 1 and hence out of the recesses 58, 59 during torque transmittal despite the bias of the springs 53 as hereinafter to be described.

It should also be noted that the springs 53 act between the under surface of the cage 28 and the upper surface of the associated pawl 51, 52 which is biased axially into engagement with the annular member 36 which is pressed against the base of the recess 12 in the body 13 so that the reaction force on the cage 28 biases it upwardly away from the other clutch part 15 and towards said one clutch part 20 as shown in FIG. 4.

A pair of radially outwardly projecting pegs 62a, 62b are provided on the annular member 36 for engagement with an associated pawl 51, 52 respectively as shown in FIG. 4 and as hereinafter to be described.

In use, during torque transmittal the balls 25 are engaged in the torque transmitting abutments 29, 30 and are prevented from moving out of engagement therewith as a result of the force applied to the one clutch part 20 by the coil compression spring 24. The torque transmittal from the driving member 10 to the driven member 17 through the balls 25 produces an axially directed reaction force between the balls and the one and other clutch parts proportional to the transmitted torque which, when the torque exceeds a predetermined value, is sufficient to overcome the pressure exerted by the spring 24. Thus, at this torque one clutch part 20 commences to move axially away from the other clutch part 15 and simultaneously the balls 25 commence to roll in the direction of rotation of the one clutch part 15 on that part of each abutment recess 29, 30 which is respectively rearmost and foremost in the direction of rotation.

Therefore, the balls 25 now commence to move out of torque transmitting engagement with the recesses 29 and 30 by a simple rolling movement permitted by the engagement between the balls and the edges of the recesses 29 and 30. As the balls rotate they also move circumferentially or orbitally relative to the one and other clutch parts 20, 15 thereby causing the cage to also rotate relative thereto.

This causes the spacers 34 to move out of their recesses 35a onto the planar parts which provide a second track of the one clutch member 20 and of the annular member 36 between the recesses. The surface of the track 36 is very slightly below the level of the planar part of the other clutch part 15 and hence, at this stage, the spacers 34 are maintained out of pressure engagement with both the track 36 and the one clutch part 20.

Rotation of the cage 28 continues until the torque transmitting balls 25 enter their respective receiving means which is the next drive transmitting abutment 30 in the one clutch part 20 circumferentially adjacent to the one they have left. The pegs 38 depending from the one clutch part 20 then engage the end surfaces 39a of the slots 39 and hence positively arrest movement of the cage 28 at this position. As the balls 25 enter the receiving means they move out of pressure engagement with the parts 20, 15 and hence the whole of the load imposed by the spring 24 on the one clutch part 20 is taken by the spacers 34 which are engaged between the track 36 and the planar parts of the one clutch part 20 between the recesses 35. This condition is shown in FIG. 4.

When the balls 25 have entered the receiving means and hence no longer drive the cage 28 any continuing tendency for rotation of the cage 28 due to inertia is arrested by the hereinbefore mentioned pegs 38 engaged with the slot ends 39a and hence the balls 25 are maintained within their receiving means.

Because the torque transmitting balls 25 are maintained completely unloaded after disengagement of the torque transmitting connection, i.e. when they are engaged in their receiving means no damage or wear will occur to the torque transmitting parts of the clutch if the driving member continues to rotate after the torque limiting clutch has disengaged.

Because of the tapered configuration of the bores 27 and the biasing effect of the springs 53, the balls 25 are maintained within their receiving means in the one clutch part 20 and are maintained spaced from the surface of the other clutch part 15 so that there is no tendency for the balls to engage the torque transmitting recesses 29 which they might otherwise do, even though under no load, and thus avoid any clatter which might otherwise arise.

Turning now to consider re-setting of the torque limiter. In accordance with the present invention this is achieved automatically merely be reversing the direction of relative rotation between the driving and driven clutch members 10, 17 to that which caused disengagement of the clutch.

It is further to be noted that on disengagement of the clutch when the balls 25 roll out of their recesses 29, 30 and cause axial movement of the one clutch part 20 away from the other clutch part 15, this lifts the conical end portion 61 of the pegs 38 out of the recesses 60 formed in the pawls 51, 52. Complete disengagement between the tip 61 and recesses 60 does not occur until, in the example under discussion, the pawl 52 has moved so that its end part 52a is not in alignment with the pawl recess 59 so that when the pawl 52 is based outwardly by its spring 53 it engages with the cylindrical peripheral surface 57 of the body 13 thereby permitting the cage to rotate as described hereinbefore. Of course on disengagement in this direction it does not matter whether the pawl 51 is in engagement with it recess 58 or not since in this direction of disengagement the pawl 51 is in a "trailing condition". However since the clutch must be capable of disengagement in either direction it is necessary that both pawls are maintained out of engagement with their recesses 58, 59 until movement of the cage has moved them past the recess upon disengagement of the clutch.

Thus, when the clutch is fully disengaged the pawls 51, 52 would both be biased outwardly into engagement with the surface 57 but upon rotation of the one part and cage 28 together this would cause, in the example under discussion, the pawl 52 to engage with its recess 59. To prevent this the pins 62 are provided. Thus, when the cage has rotated to be in engagement with the pegs 38 the pin 62b is in alignment with a tail part 52b of the pawl 52 and thus maintains it out of engagement with the wall 57 as shown in FIGS. 2 and 4. On the other hand the pin 62a is not in engagement with the pawl 51 which is biased outwardly by its spring 53 into engagement with the wall 57 also as shown in FIGS. 3 and 4.

Of course, when the clutch has disengaged as a result of relative rotation in the opposite direction to that described hereinbefore then it will be the pin 62a which is in engagement with the pawl 51 to maintain it out of engagement with the wall 57 whilst the pawl 52 will be biased into engagement with the wall 57.

Bearing in mind the above condition of the clutch during continued rotation on disengagement; when it is desired to reset the clutch it is merely necessary to arrest the relative rotation arising on disconnection of the drive and to reverse it. When the direction of relative rotation is reversed the one clutch part 20 and the cage 28 are moved together, relative to the other clutch part 15. The cage 28 moves with the clutch part 20 because the rollers 34 are engaged in the bores 33 and the balls 25 are engaged in the bores 27 and in the recesses 30 and this serves to releasably connect the cage 28 with the part 20. This rotation of the cage causes the pawls 51, 52 to likewise rotate until the end portions 51a of the pawl 51 enters its recess 58 in the surface 57 which then prevents further relative rotation between the cage and the other clutch part 15. The pawl and recess are dimensioned so that this occurs at the same instant that the bores 27 in the cage are aligned with the drive recesses 29 in the clutch part 15 so that the balls 25 enter the same recesses 29 as they occupied during torque transmittal prior to disengagement.

Continued relative rotation between the driving and driven clutch members 10, 17 in the reverse direction then causes relative rotation between the one clutch part 20 on the one hand and the cage 28 and other clutch part 15 on the other hand until the receiving means 35a and 35b for the spacers 34 become aligned with the spacers which then permits the one clutch part 20 to move axially towards the other clutch part 15 under the bias of the spring 24. The angular relationship between the spacer receiving means 35 and the drive recesses 30 is such that the drive recesses 30 engage with the balls 25 at the same time that the receiving means 35 engage with the spacers 34 so that the clutch is re-set. Again the balls 25 engage the same drive recess 30 as they engaged prior to disengagement.

If the clutch has disengaged as a result of rotation in the opposite direction to that described above then it is reset by likewise performing a reverse rotation in the opposite direction to that described above in which case it will be the pawl 52 whose end portion 52a engages with the recess 59 to cause engagement of the balls 25 in the recesses 29 and the simultaneous prevention of relative rotation between the cage 28 and clutch part 15 followed by rotation between the clutch part 20 and the cage 28 and clutch part 15 together to cause engagement between the receiving means 35 and the spacers 34 and the balls 25 and the recesses 29 and 30.

It will be appreciated that during the re-setting operation, when movement of the cage 28 relative to the clutch part 15 is prevented, by engagement of the appropriate pawl, rotation between the one part 20 on the one hand the cage 28 on the other hand is permitted as a result of the rolling engagement of the pairs of rollers providing the spacers 34. The clutch part 20 is maintained out of pressure engagement with the balls 25 during this operation until the spacers 34 are received in the receiving means 35.

When the clutch re-engages as a result of axial movement of the clutch part 20 towards the clutch part 15 the tips 61 of the pegs 38 engage the inclined surfaces of the recess 60 of each pawl and causes pivotal movement thereof out of engagement with the recesses 58 and 59 to the position shown in FIG. 1.

If desired, the number of spacers and torque transmitting balls may be different to that described hereinbefore, either more or less. Further, instead of torque transmitting balls, the torque transmitting elements may comprise generally cylindrical rollers. Likewise the spacers may be a pair of spherical balls.

Figure 5:
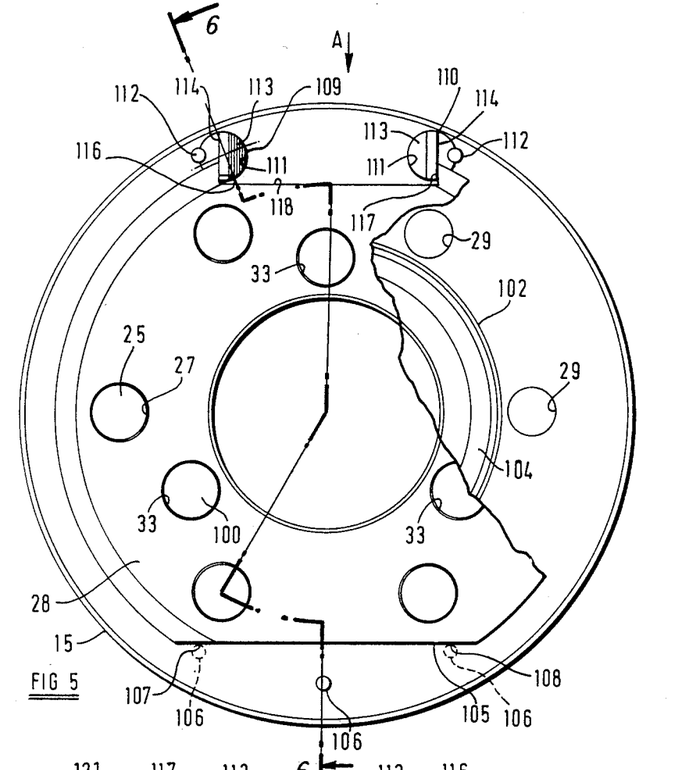
FIG. 5 is a diagrammatic plan view partly broken away of another torque limiting clutch embodying the invention, showing the parts in torque transmitting relationship.
Figure 6:
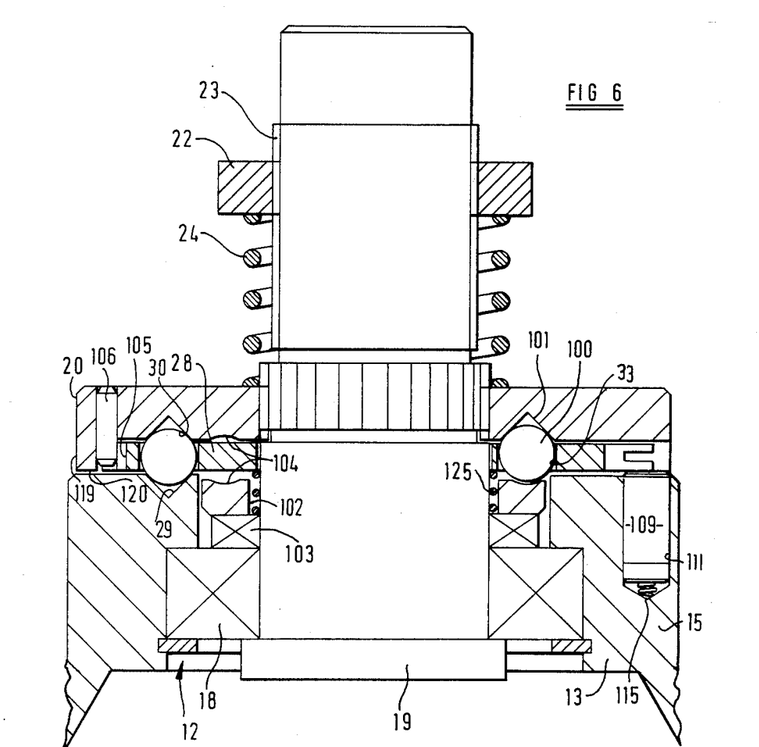
FIG. 6 is a diagrammatic cross-sectional view on the line 6—6 of FIG. 5.
Figure 7:
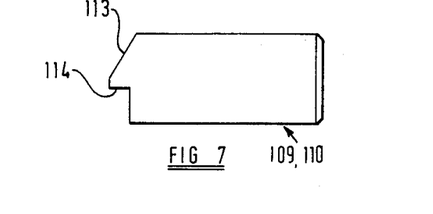
FIG. 7 is a side elevation to an enlarged scale, of a pawl of the clutch of FIG. 5.

A second embodiment of the invention is illustrated in FIGS. 5 to 8 and comprises a torque transmitting clutch which is similar to the clutch of the first embodiment except for the pawl arrangement and the other features hereinafter described. In FIGS. 5 and 6 the same reference numerals have been used as were used in FIG. 1 to refer to corresponding parts. It will be noted that the detailed configuration of parts of the clutch of this embodiment are different to that of the embodiment shown in FIG. 1 but this has no effect on their mode of function and to avoid prolixity of description only significant features of difference will be described hereinafter.

In this embodiment the spacers comprise, instead of the two rollers 34, a single ball 100 provided in each of three spacer receiving bores 33 and the clutch part 20 is provided with three spacer receiving means 101 each of generally conical configuration. A track for the spacers 100, which comprises part of the clutch part 20 is provided by means of an annular member 102, received in a recess 12 formed in the body 13. In this embodiment the track is not splined to the driving member 17 but is mounted for rotation relative thereto on a thrust race 103 disposed between the track member 102 and the race 18. In the example shown a part circular in cross-section groove 104 is provided in the member 102 and the clutch member 20 for the spacers 100, but this is not essential where a greater number of balls 100, or larger balls 100 than those shown, are provided.

It is, therefore, to be noted that in this embodiment the track member 102 does rotate relative to the clutch part 20 and that orbital movement of the spacer balls 100 with the cage 28 relative to the part 20 on resetting is permitted as a result thereof.

In this embodiment the restraining means to limit rotation of the cage 28 relative to the one clutch part 20 comprises a chordal surface 105 formed in the periphery of the cage 28 which cooperates with a peg 106 depending downwardly from the one clutch part 20 parallel to the axis of rotation of the clutch. As shown in FIG. 5 from which the part 20 is omitted for clarity when the clutch is engaged, the peg 106 is in the middle of the associated chordal surface 105 whilst, when the clutch is fully disengaged the peg 106 engages an end part 107, 108 of the surface 105 depending upon the direction of disengagement of the clutch, to limit further relative rotation between the cage 28 and the one clutch part 20.

In this embodiment two pawls 109, 110 project upwardly from the body 13. Each pawl is received in a generally cylindrical bore 111 in the body 13 and a locating pin, such as a split pin 112 is received in axially extending part-circumferential grooves formed in the wall of the bore 111 and the wall of the associated pawl 109, 110. At its upper end each pawl 109, 110 is formed with an inclined surface 113, and an axially extending abutment surface 114. A coil compression spring 15 is provided at the base of the recesses 111 normally to bias the associated pawl 109, 110 upwardly towards the one clutch part 20.

The pawls 109, 110 are arranged to cooperate with abutment surfaces 116, 117 provided at the ends of a cut out region 118 of the cage 28 diametrically opposite to the chordal region 105.

Figure 8:
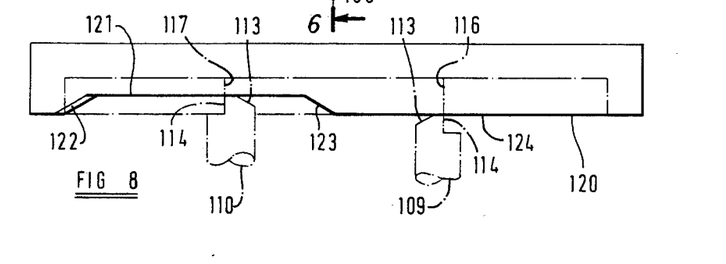
FIG. 8 is fragmentary side elevation of part of the clutch of FIG. 5 in the direction of the arrow A.

The one clutch part 20 is provided with a peripheral flange portion 119, the lower surface 120 of which provides a cam surface for engagement by the pawls 109, 110 and which, as best shown in FIG. 8, has a raised part 121 connected by inclined parts 122, 123 to a lower part 124.

In order to maintain the cage 28 against the one clutch part 20, so as to maintain the torque transmitting balls out of the recesses of the other clutch member a coil compression spring 125 is interposed between the cage 28 and the upper race of the thrust bearing 103.

In other material respects the clutch is as described in connection with the first embodiment.

In use of the second embodiment, disengagement of the clutch commences as described in connection with the first embodiment. As the spacers 100 move out of their recesses 101 onto the track parts 104 of the one clutch part 20 and the track member 102 the appropriate surface 107 or 108 approaches the pin 106. The torque transmitting balls 25 enter their respective receiving means, i.e. their next drive transmitting abutment 30 circumferentially adjacent to the ones they have left and when the surface 107, 108 is engaged by the pin, rotation of the cage 28 relative to the part 20 is arrested. As the balls 25 enter the receiving means they move out of pressure engagement with the parts 20, 15 and as in the first embodiment the whole of the load imposed by the spring 24 on the one clutch part 20 is taken by the spacers 100 which are engaged between the track member 102 and the track portion 104 of the one clutch part 20 between the recesses 101. Thus, except for the means for arresting any tendency for rotation of the cage 28 to continue due to inertia, disengagement occurs as described in connection with the first embodiment.

In the following description it will be assumed that relative rotation has occurred such that the one clutch part 20 has rotated clockwise, in FIG. 5, relative to the other clutch member part 15 and hence that the peg 106 has engaged the part 107 of the surface 105.

It is to be noted that prior to disengagement the end portions of the lower part 124 of the surface 120 adjacent the inclined portions 122, 123 engage the pawls 109, 110 and maintain them within the body 113 and out of position for engagement with the abutment surfaces 116, 117 of the cage 28 so that the cage is free to move on disengagement.

When disengagement is completed the raised portion 121 has moved so that, as shown in chain dotted line in FIG. 8, the surface 123 is adjacent to the abutment surface 117 but is sufficiently spaced therefrom as to permit the pawls to move out of their recesses as the space provided by the raised portion 121 between the surface 123 and abutment surface 117 passes over each pawl.

Thus, on continued rotation of the clutch after disengagement as the above described raised portion passes over each pawl, each pawl is caused to move upwardly by its spring and is then forced downwardly by reaction between the inclined surface 123 and the top of the pawl. It will be noted that the pawl 109 is displaced downwardly by the surface 123 before it moves into circumferential alignment with the abutment surface 116 and hence does not engage with the surface 116.

When it is desired to reset the clutch then as in the case of the first embodiment, it is merely necessary to arrest the relative rotation and to reverse it. In the present example when the direction of relative rotation is reversed the one clutch part 20 and cage 28 are moved together, relative to the other clutch part 15 as in the first embodiment, this rotation of the cage is permitted initially without interference from the pawls since they are maintained out of engagement with the cage by the cam surface 120.

For example, assuming that at the beginning of reverse rotation they engage the part 124 of the surface 120 they are then maintained out of engagement.

However, if reverse rotation begins at an angular relationship such that the pawl 109 is permitted to move upwardly into the space provided by the raised portion 121 it engages the abutment surface 117 of the cage but because it is the inclined surface part 113 of the pawl which is thus engaged the pawl 109 is forced downwardly into its recess and passage of the cage is permitted.

However, when the reverse rotation is such that the pawl 110 has moved upwardly into the space then it is the abutment surface 114 thereof which engages the abutment surface 117 of the cage and thus rotation of the cage relative to the clutch part 15 is arrested whilst the other clutch part 20 continues to rotate.

The pawls and abutment surfaces 117, 116 are arranged that they interengage when the bores 27 in the cage are aligned with the drive recesses 29 in the clutch part 15 so that the balls 25 enter these recesses. Again they enter the same recesses as they occupied prior to disengagement.

Continued relative rotation between, on the one hand, the one clutch part 20 and, on the other hand, the now secured together cage 28 and other clutch part 15 continues until the receiving means of the spacers 100 become aligned therewith which then permits the one clutch part 20 to move axially towards the other clutch part 15 under the bias of the spring 24. Again the angular relationship between the spacer receiving means 101 and the drive recesses 30 is such that the drive recesses 30 engage the balls 25 at the same time that the receiving means 101 engage with the spacers 100 so that the clutch is reset.

Figure 9:
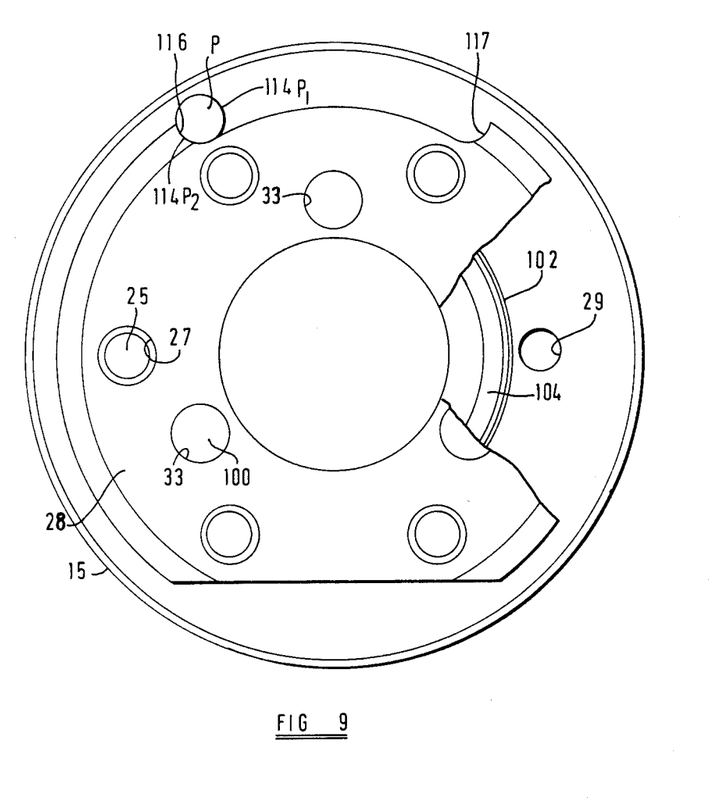
FIG. 9 is a diagrammatic plan view, partly broken away, of another clutch embodying the invention.

Referring now to FIG. 9, a third embodiment of the invention is illustrated in which the clutch is essentially as described in connection with FIGS. 5 to 8 but in which only a single pawl P is provided instead of two pawls 109, 110. The pawl is again cylindrical but is provided with two oppositely directed vertical abutment surfaces 114p, 114p2 each similar to the single abutment surface 114 of the pawls described hereinbefore.

The cage plate 28 is again provided with two abutment surfaces 116, 117 but at greater spacing than the surfaces 116,117 as shown in FIG. 5.

In other respects, the clutch is as described in connection with FIGS. 5 to 8 and the same reference numerals have been used to refer to corresponding parts.

In use, disengagement occurs as described in connection with FIGS. 5 to 8 as does, in essence, resetting except that if the coupling is disconnected as a result of relative rotation in a different direction to that which caused disengagement on a previous occasion, and is then reset the cage plate will be rotated through an angle of 60° relative to the position it occupied prior to disengagement so that the torque transmitting balls and spacers will engage in different recesses.

Figure 10:
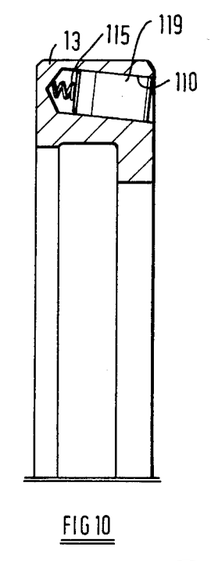
FIG. 10 is a fragmentary cross-sectional view showing part of a modification applicable to the clutches of FIGS. 5 to 8 and FIG. 9.

To avoid repeated movement of the pawls of the clutch of FIGS. 5 to 8 inwardly and outwardly of their bores, or of the pawl of the clutch of FIG. 9, means may be provided to retain the pawl or pawls out of engagement with their associated abutment surfaces at high speeds of rotation. For example, as shown in FIG. 10, the cylindrical bore 111 in which the pawls 109, 110 are received, and in FIG. 10 only the pawl 109 is illustrated, may be inclined in a vertical plane to the axis of rotation of the clutch and at an appropriate angle, for example of not less than 5°, so that centrifugal force acts to maintain the pawl within its associated bore at high speed. The same angular orientation as illustrated in FIG. 10 may be applied to the bore for the single pawl 114p of FIG. 9.

Figure 11:
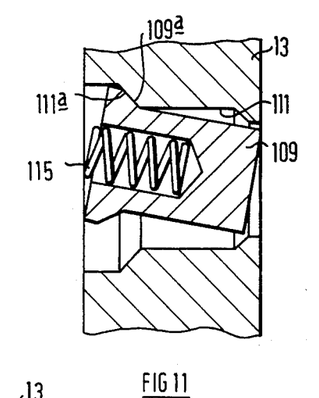
FIG. 11 is a fragmentary cross-sectional view showing part of another modification of the clutches of FIGS. 5 to 8 and of FIG. 9 in one position.
Figure 12:
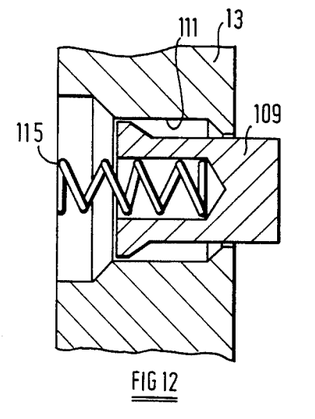
FIG. 12 ia a view similar to that of FIG. 11 but showing the modification in a second position.

In another modification illustrated in FIGS. 11 and 12, each pawl may be provided with a mechanical latch arrangement. In this case, each pawl, 109, 110 (only the pawl 109 being shown in FIGS. 11 and 12) is mounted in its bore 111 for angular movement under centrifugal force when in an inner position shown in FIG. 11, and is provided with a shoulder 109a which engages a shoulder 111a of the bore 111 and these are held in mutual engagement by the spring 115 at high speed as shown in FIG. 11, so that the pawl is positively retained in a withdrawn position and are released out of engagement at low speed, as shown in FIG. 12, so that the pawl can move to its operative position for engagement with its associated abutment surface.

The same mechanical latch arrangement can be applied to the pawl 114p of FIG. 9.

Other variants are possible for both the FIGS. 5 to 8 and FIG. 9 embodiments such as a rough surface or other means for providing a relatively high co-efficient of friction between the or each pawl and its associated bore.

We claim:

1. An overload clutch comprising a driving part, a driven part, a cage, means mounting said parts and cage for relative rotation and each of said parts having at least one torque transmtting abutment, a rolling element disposed between said parts and guided by said cage, biasing means to bias axially said element into torque transmitting engagement with said torque transmitting abutments of said parts when said clutch is engaged, said rolling element being movable out of engagement with said torque transmitting abutments to disengage the clutch on application of a torque exceeding a predetermined torque to one of said parts, a recess in one of said parts to accommodate said element when the clutch is disengaged, a spacer, movable by said cage into spacing relationship with said parts on disengagement of the clutch, wherein said clutch can be disengaged by relative rotation between said part in either direction and said clutch can be re-engaged by relative rotation between said parts in the opposite direction to that which caused disengagement, said clutch including two pairs of interengageable abutments, one abutment of each pair being provided on the cage and the other on the other of said parts and operable to cause said cage and said other of said parts to rotate together, one pair of abutments being operable on relative rotation between the clutch parts in the opposite direction to that in which the other pair is operable, biasing means normally to bias one abutment of each pair in a direction towards engagement with the other abutment of the pair, first control means being provided on said one clutch part;

(a) to prevent interengagement of said abutments of one pair when said clutch is disengaged as a result of relative rotation in one direction whilst permitting interengagement of said abutments of the other pair on resetting by relative rotation in the reverse direction to said one direction; and (b) to prevent interengagement of said abutments of the other pair when said clutch is disengaged as result of relative rotation in the opposite direction to said one direction whilst permitting interengagement of the abutments of said one pair on resetting by relative rotation in the reverse direction to said other direction and second control means to maintain said abutments of both pairs out of interengagement during the initial stages of disengagement of said clutch.

2. An overload clutch according to claim 1 wherein a separate pawl provides each of said one abutments and each pawl is mounted on the cage for pivotal movement about an axis parallel to the axis of rotation of the clutch and has an end part adapted to engage an abutment surface provided on said other clutch part.

3. An overload clutch according to claim 2 wherein said first control means comprises an abutment provided on said one clutch part which is moved into engagement with a pawl to prevent engagement of the pawl with an abutment of said other pair as a result of relative rotation between said cage and one clutch part on disengagement of said clutch.

4. An overload clutch according to claim 2 or claim 3 wherein said second control means comprises a pair of abutments extending from said one clutch part in a direction parallel to the axis of rotation of said clutch part and engageable with said pawls by means of cam surfaces so as to maintain said pawls out of engagement with said pawl abutment surfaces when said abutments of said second control means are engaged with said pawls when said clutch is in the driving position, and to be disengaged therefrom as a result of axial movement of the one clutch part away from said other clutch part on disengagement of said clutch as a result of said rolling element being displaced out of said torque transmitting abutment and engagement of said cam surfaces causing said pawls to be moved out of engagement with said pawl surfaces on movement of said one clutch part towards said other clutch part at the end of resetting as said torque transmitting rolling element enters its torque transmitting abutment.

5. An overload clutch according to claim 1 wherein a separate pawl provides each of said other abutments and each pawl is mounted on said other clutch part for movement generally parallel to the axis of rotation of the clutch and has an end part adapted to engage an abutment surface provided on said cage.

6. An overload clutch according to claim 5 wherein said first and second control means comprises a cam surface provided on said one clutch part and facing said other clutch part and having a first surface part adjacent said other part which engages said pawls so that said pawls are maintained out of engagement with said abutment surfaces of the cage during said initial stages of disengagement, and having a second surface part spaced further away from said other clutch part to permit said pawls to move into position for engagement with said associated abutment surface of the cage and third, inclined, surface parts between said first and second parts whereon on continued relative rotation between said one and other clutch parts after disengagement, said third surface parts displace the pawls out of position for engagement with said abutment surfaces of the cage and wherein each pawl is provided with an inclined surface facing in the circumferentially opposite direction to its abutment surface so that on reverse rotation in one direction said inclined surface of one of said pawls is engaged by an abutment surface to displace said pawl towards said other clutch member to permit passage of said cage, whilst on reverse rotation in the other direction said other pawl is thus displaced to permit passage of said cage on relative rotation in said other direction.

7. An overload clutch according to claim 1 wherein a single pawl provides each other abutment, said pawl being mounted on said other clutch part for movement generally parallel to the axis of rotation of said clutch and having an end part having a first abutment surface adapted to engage one abutment surface provided on said cage, and a second abutment surface adapted to engage said other abutment surface provided on said cage.

8. An overload clutch according to claim 7 wherein said first and second control means comprises a cam surface provided on said one clutch part and facing said other clutch part and having a first surface part adjacent said other clutch part which engages said pawl so that said pawl is maintained out of engagement with said abutment surfaces on said cage during said initial stages of disengagement and having a second surface part spaced further from each other clutch part to permit said pawl to move into position for engagement with said abutment surfaces of said cage, and third, inclined, surface parts between said first and second surface parts wherein, on continued relative rotation between said one and other clutch parts after disengagement, said third surface parts displace said pawl out of position for engagement with said abutment surfaces of said cage whilst said pawl is permitted to move into engagement with an associated abutment surface of said cage on reverse rotation.

9. An overload clutch according to claim 5 or claim 7 wherein means are provided to restrain the or each pawl out of engagement with an associated abutment surface at high speeds of rotation of said clutch.

10. An overload clutch according to claim 5 or claim 7 wherein the or each pawl is received in a bore inclined to the axis of rotation of said clutch in a radial direction so that centrifugal force urges the or each pawl inwardly of its bore away from an associated abutment surface.

11. An overload clutch according to claim 5 or claim 7 wherein the or each pawl is received in a bore which permits of tilting movement of the pawl under centrifugal force when said pawl is at an inner end of said bore, there being inter-engageable abutment means provided between the pawl and its bore and biasing means to maintain the abutment means in engagement at high speed and to permit of the abutment means to become disengaged at low seed so that the pawl can move into an operative position to engage its associated abutment surface.

12. An overload clutch according to claim 1 or claim 2 or claim 5 or claim 7 wherein interengageable abutments are provided to restrain rotation of the cage relative to said one part on disengagement.

13. An overload clutch according to claim 1 wherein said spacer is rotatable and circular in cross-section taken radial to its axis of rotation and said spacer is positioned between a first track comprising part of one of said clutch parts and a second track comprising part of said one of said clutch parts, there being recesses in at least one of said track of such dimensions as to maintain the spacer out of pressure contact with the tracks during torque transmittal.

14. An overload clutch according to claim 1 or claim 2 or claim 5 or claim 7 wherein the spacer comprises a pair of roller bodies in mutual rolling engagement and one in rolling engagement with a first track part comprising part of one of said clutch parts and the other in rolling engagement with a second track part comprising part of said one clutch, there being recesses in at least one of said tracks of such dimensions as to maintain the spacer out of pressure contact with the tracks during torque transmittal.

* * * * *